United States Patent [19]

Vassiliou

[11] Patent Number: 4,647,481
[45] Date of Patent: Mar. 3, 1987

[54] RHEOLOGY CONTROL OF POLYVINYL FLUORIDE DISPERSIONS

[75] Inventor: Eustathios Vassiliou, Newark, Del.

[73] Assignee: E. I. Du Pont de Nemours and Company, Wilmington, Del.

[21] Appl. No.: 831,420

[22] Filed: Feb. 20, 1986

[51] Int. Cl.$^4$ .............................................. B05D 3/02
[52] U.S. Cl. .................................. 427/385.5; 427/386
[58] Field of Search ............................. 427/385.5, 386

[56] References Cited

U.S. PATENT DOCUMENTS

| | | | |
|---|---|---|---|
| 2,953,818 | 9/1960 | Bartron | 264/289 |
| 3,110,692 | 11/1963 | Proctor | 260/30.2 |
| 3,139,470 | 6/1964 | Prengle et al. | 264/289 |
| 3,779,976 | 12/1973 | DeMarsico et al. | 260/32.8 R |

Primary Examiner—Michael R. Lusignan
Attorney, Agent, or Firm—Richard H. Burgess

[57] ABSTRACT

The viscosity of thixotropic dispersions of polyvinyl flouride in latent solvents is controlled by adding volatile alcohols or acids to decrease viscosity, stirring the dispersion to eliminate gas bubbles, and then adding volatile amines to increase viscosity on curing the amine and the alcohol or acid evaporate together to keep viscosity in desirable ranges.

2 Claims, No Drawings

RHEOLOGY CONTROL OF POLYVINYL FLUORIDE DISPERSIONS

BACKGROUND OF THE INVENTION

This invention provides an improved method for disposing of bubbles in dispersions of polyvinyl fluoride (PVF) in latent solvents, followed by coating at appropriate high viscosities.

Polyvinyl fluoride (PVF) is generally not soluble at room temperature in conventional solvents, however, it can be put into solution with so-called latent solvents. A dispersion of PVF powder is suspended in latent solvent and heated to a first temperature at which a gel is formed and then to a higher second temperature at which a solution is formed. Latent solvents and other technology useful in handling PVF are discussed in U.S. Pat. Nos. 2,953,818—Bartron (Sept. 27, 1980) and 3,139,470—Prengle et al. (June 30, 1964), both incorporated herein by reference.

Various additives to latent solvent dispersions have been proposed, including N-acetyl substituted piperidine and morpholine in U.S. Pat. No. 3,110,692—Proctor (1963). U.S. Pat. No. 3,779,976—DeMarsico et al. (1973) proposes the use of an isopropanol solution of polymers containing acid groups and polymers containing oxazolidine groups.

Optimum techniques have not been proposed for disposing of bubbles in a dispersion with low viscosity, followed by painting with the dispersion at a high and constant enough viscosity.

SUMMARY OF THE INVENTION

The invention provides a process of coating an object with polyvinyl fluoride wherein a thixotropic dispersion of polyvinyl fluoride in latent solvent and containing a viscosity-reducing volatile material selected from alcohols and acids to reduce viscosity of the dispersion is stirred to minimize gas bubbles;

then a volatile amine is added to the dispersion with continuing stirring to increase viscosity to a level desired for coating; and then the dispersion is coated on a substrate and heated to drive off the volatile amine and alcohol or organic acid simultaneously while keeping the viscosity in a range which permits coalescence and leveling which minimize sagging of the coating, and curing the coating.

Preferably, the viscosity-reducing agent is propyl alcohol and the amine is triethylamine.

DETAILED DESCRIPTION

It has been found that the viscosity of a PVF dispersion in latent solvent can be reduced enough to facilitate stirring to dispose of air or gas bubbles and then increased enough to permit painting with minimal sagging if appropriate agents are added before and after stirring and if these agents are both volatile enough to be fugitive from the coating more or less simultaneously as the coating is cured with elevated temperature. The volatile viscosity-reducer is an organic acid or preferably an alcohol. The volatile viscosity-increaser is an amine.

EXAMPLE

The following compositions, in parts by weight, are prepared by mixing the ingredients.

| Composition A | |
|---|---|
| Polyvinyl fluoride polymer (agglomerates of 0.1–0.5 mm ultimate particle size) | 16,000 |
| Propylene carbonate | 21,000 |
| n-Propyl alcohol | 2,400 |
| Epoxy resin (epoxy eq. wt. about 1000) DER 664U from Dow Chemical Co. (60% solution in propylene carbonate) | 266 |
| triphenylphosphite | 16 |
| This composition is sand ground to a workable viscosity and filtered. | |
| Composition B | |
| Material of Composition A | 2,822 |
| Triethylamine | 8.1 |

Composition A is placed in the conical shaped container of the apparatus. The container has a paddle-stirrer, which stirs the mixture continuously. The viscosity of the mixture is such that during this stirring deaeration occurs. After the deaeration step is completed, the triethylamine is added very slowly with continuing stirring to make Composition B so that the viscosity reaches a value higher than 8,000 centipoises (measured with #3 spindle on a Brookfield Viscometer at 10 rpm). This material is now completely free of air bubbles and at the same time it is viscous enough to prevent sagging of the thick coating.

An additional advantage of using both a volatile alcohol and a volatile amine is that simultaneous evaporation of the two components with opposite effects on viscosity results in a more stable, non-sagging rheological system.

After curing at 200° C. for 5 min., under a solvent-rich atmosphere and 15 min. in flowing air, which removes the amine and alcohol simultaneously and cures the coating, satisfactory coatings of 6–10 mils (150–250 μm) were obtained. With thicker coatings, slow evaporation of the amine and alcohol at room temperature (26° C.) is advisable.

I claim:

1. A process of coating an object with polyvinyl fluoride wherein a thixotropic dispersion of polyvinyl fluoride in latent solvent and containing a viscosity-reducing volatile material selected from alcohols and acids to reduce viscosity of the dispersion is stirred to minimize gas bubbles;

a volatile amine is added to the dispersion with continuing stirring to increase viscosity to a level desired for coating;

the dispersion is coated on a substrate and heated to drive off the volatile amine and alcohol or acid simultaneously while keeping the viscosity in a range which permits coalescence and leveling which minimize sagging of the coating, and curing the coating.

2. The process of claim 1 wherein the viscosity-reducing agent is propyl alcohol and the amine is triethylamine.

* * * * *